Oct. 4, 1966     J. D. RICHARD     3,276,254
ICE DETECTION APPARATUS
Filed Oct. 11, 1963     4 Sheets-Sheet 1

COLD JUNCTION

HOT JUNCTION

| PROBE ICE COVERAGE | ΔT₁ | ΔT₂ | ΔT₂−ΔT₁ | DIFF. AMP. OUTPUT | ICE INDICATOR |
|---|---|---|---|---|---|
| NONE | 25°C | 25°C | ZERO | ZERO | SAFE |
| 20 % | 20°C | 30°C | 10°C | LOW | WARNING |
| 40 % | 15°C | 35°C | 20°C | MED. | MED. ICE |
| 60 % | 10°C | 40°C | 30°C | HIGH | DANGER |

INVENTOR
Joseph D. Richard
BY Ernest A. ———
ATT'Y.

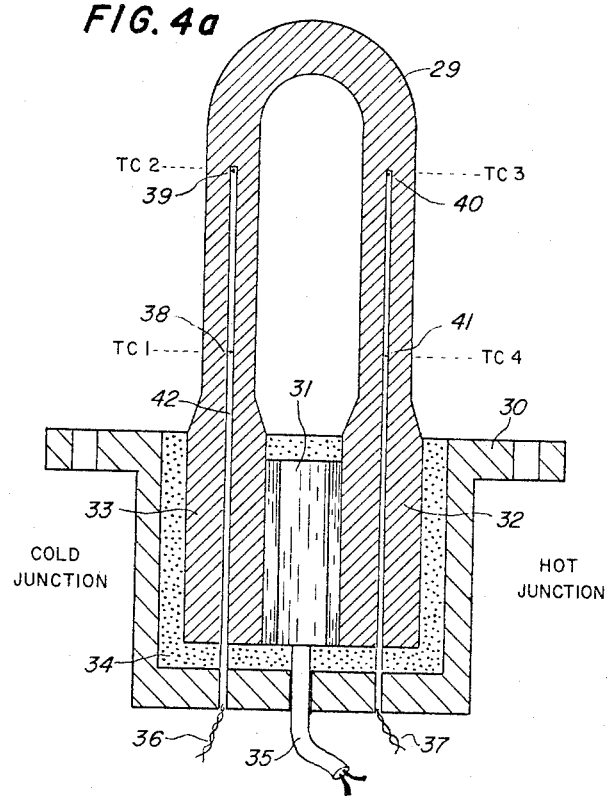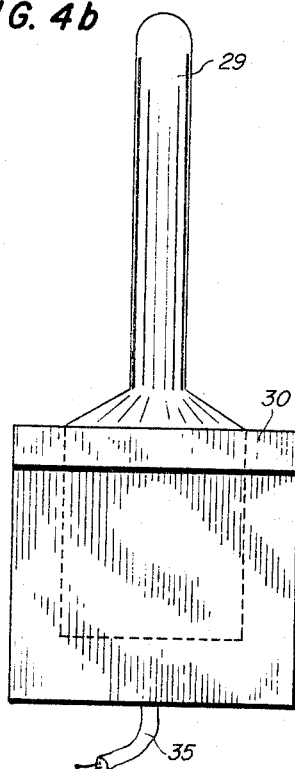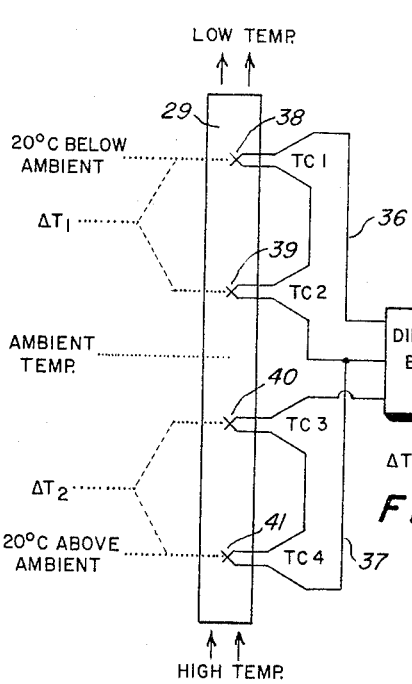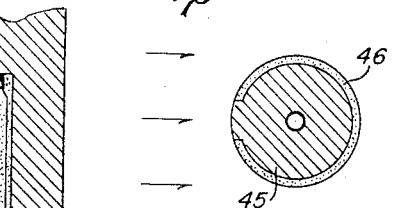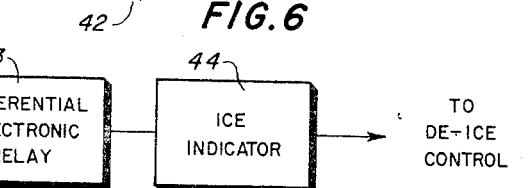

Oct. 4, 1966 J. D. RICHARD 3,276,254
ICE DETECTION APPARATUS
Filed Oct. 11, 1963 4 Sheets-Sheet 3
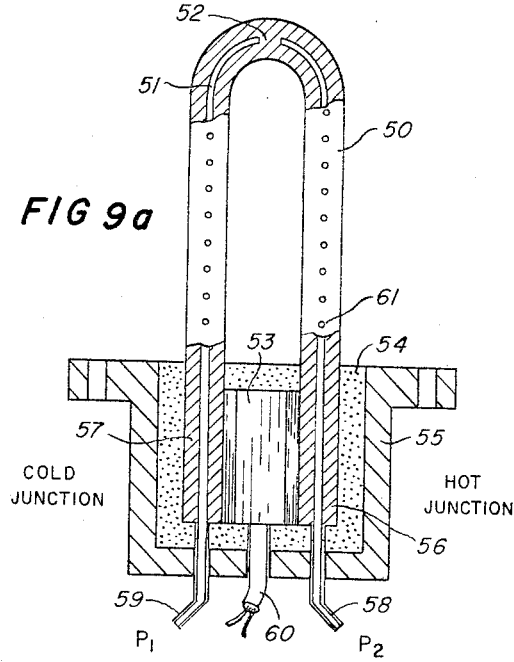
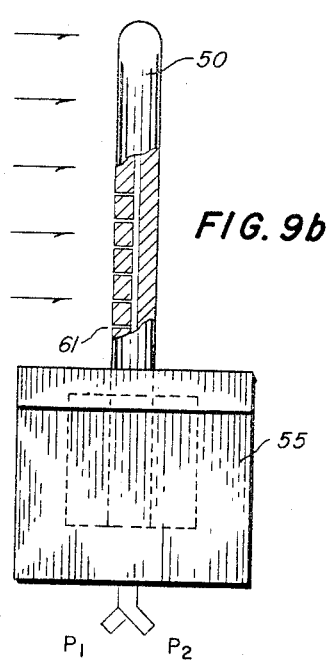
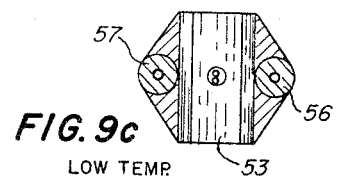
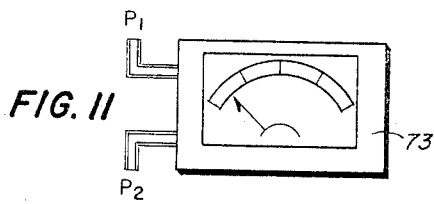
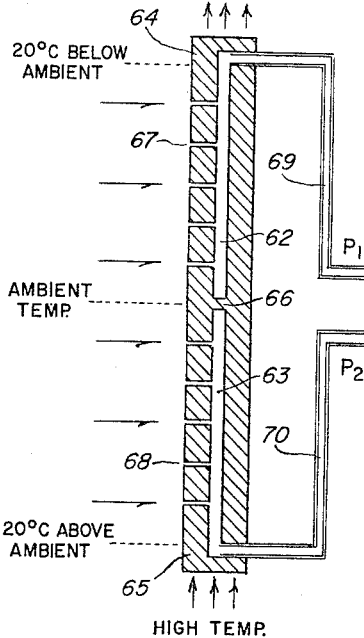
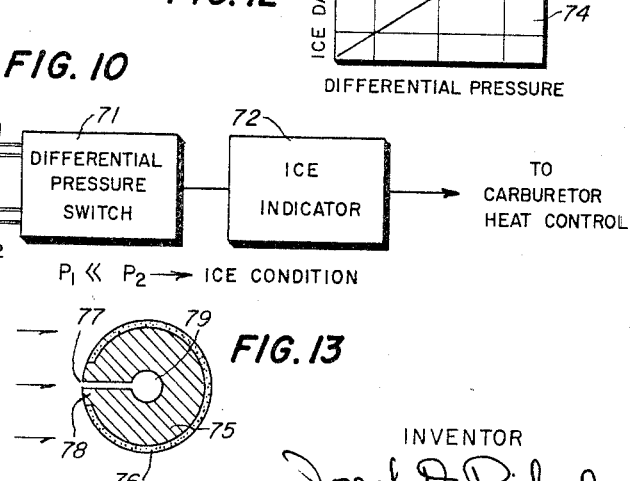
INVENTOR
Joseph D. Richard
BY Ernest J. Joenen
ATT'Y.

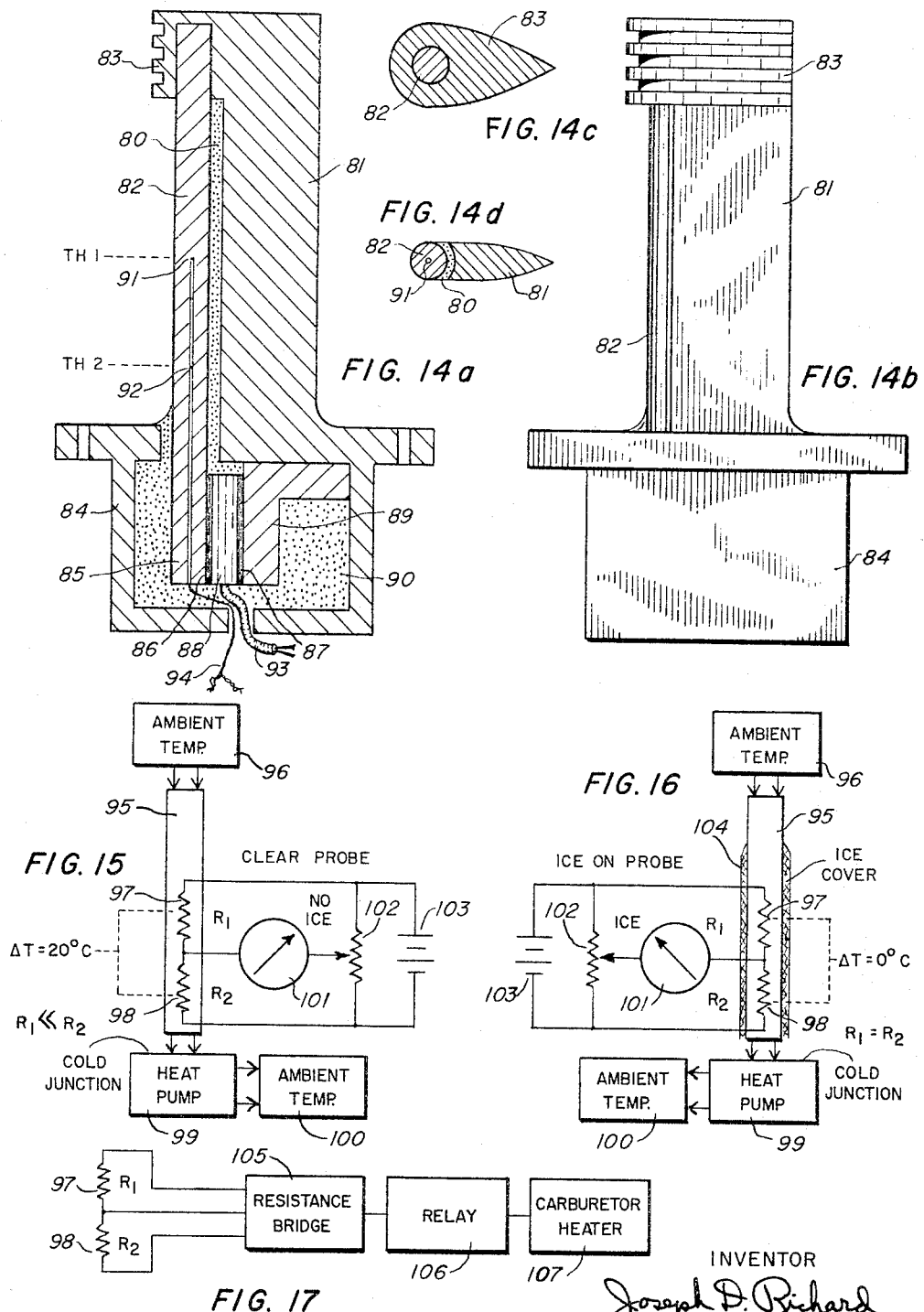

3,276,254
ICE DETECTION APPARATUS
Joseph D. Richard, Miami, Fla., assignor to Rosemount Engineering Company, Minneapolis, Minn., a corporation of Minnesota
Filed Oct. 11, 1963, Ser. No. 315,600
13 Claims. (Cl. 73—170)

The present invention relates to a method and apparatus for detecting icing conditions and more particularly to a method and apparatus for detecting the approach of icing conditions before they have actually become dangerous.

Icing is one of the more serious hazards to which aircraft are exposed. The problem continues to exist with current supersonic aircraft since considerable flying time must be spent at low speeds and low altitudes during take-off, landing, and holding operations. Rotary-wing and the new types of vertical takeoff aircraft are particularly susceptible to icing problems. The possibility of suddenly losing propulsive power due to engine intake icing is a constant danger during aircraft operations.

In the past the ice detectors used on aircraft have been of the integrating type in which the pressure developed within a heated impact tube is compared with the pressure developed within an impact tube subject to icing. The latter tube is automatically and periodically deiced when an ice coating forms. The frequency of the deicing process is taken as a measure of intensity of the icing conditions. These instruments are subject to excessive lag in indication and do not supply the warning signal until after the fact rather than before. Other types of ice detectors have been used on aircraft but they have all suffered from the disadvantages that the ice warning is received only after ice begins to form on the aircraft. There has been an urgent need for an ice detection system which could furnish the warning signal sufficiently in advance to allow the deicing system to be activated before ice begins to form on the equipment being protected.

An outstanding objection therefore to the ice detection systems used in the past has been the inability of these systems to give an advanced warning of the approach of icing conditions so that protective measures could be activated before ice actually forms on the aircraft.

Another objection to the earlier ice detection systems has been the necessity for intermittently deicing the ice detector probe in order to obtain a quantitative indication of the rate of ice formation. This results in a very low information rate and these systems are inherently incapable of indicating rapidly changing conditions.

Still another objection to the ice detectors commonly used in the past has been the inability of these systems to function at very low speeds due to insufficient Pitot pressure.

The present invention provides a method and apparatus for the detection of icing conditions which is devoid of the above mentioned disadvantages and difficulties and which is suitable for use on aircraft and other equipment susceptible to icing problems.

An object of the present invention is to provide an ice detection system which can give warning of the approach of icing conditions before ice can actually form on the aircraft or other protected equipment. This advance warning allows the deicing system to be activated either manually or automatically before conditions become critical.

A further object of this invention is to provide an ice detection system which can give a continuous quantitative indication of the approach and existence of icing danger without the necessity of repetitive deicing of the detector probe.

The present invention provides a means for quantitatively measuring and indicating the icing danger of an environment to which ice susceptible equipment is exposed. The approach of icing conditions may also be indicated quantitatively. Advanced warnings of the approach of icing conditions can be obtained before ice can form on the protected equipment thereby allowing an earlier activation of the deicing system than was formerly possible.

The ice detection system described herein uses a probe element exposed to the environment which is maintained at a temperature considerably lower than the ambient temperature. As the icing conditions become more critical, ice will always form on the cold probe before forming on the aircraft. The low temperature of the cold probe is provided by a thermoelectric heat pump. This allows the temperature differential to be maintained regardless of the absolute value of the ambient temperature. Means are provided for detecting the presence of ice on the cold probe and this is taken as a warning that the icing conditions are approaching critical values. This warning signal can be used to automatically activate a deicing system.

In one of the preferred embodiments of the present invention an elongated ice detector probe is cooled below ambient temperature on one end and heated above ambient on the other end. The probe element consists of a rod having a very high thermal conductivity. A very wide range of temperatures exist along the length of the rod varying, for example, from 40° C. below ambient on one end to 40° C. above ambient on the opposite end. When the probe is exposed to an environment with increasing humidity, ice will first form on the cold end of the probe and progress toward the center as the conditions become worse. Means are provided for indicating the extent of ice coverage along the length of the probe and displaying this information in terms of quantitative ice danger to the aircraft or other protected equipment.

In another preferred embodiment of the present invention an elongated ice detector probe is cooled substantially below ambient temperature at one end by means of thermoelectric heat pumping and maintained at or near ambient temperature at the other end by means of thermal coupling to a substantially large radiating surface exposed to the atmosphere. Means are provided for indicating the extent of ice coverage along the length of the probe and displaying the information in terms of icing danger.

Various other objects and advantages of the present invention will become more apparent from a study of the following specifications and drawings in which:

FIGURE 4 shows a plan and sectional view of another type of ice detector probe according to my invention.

FIGURE 5 shows the temperature distribution along the probe element and the gradient measuring system of the ice detector shown in FIGURE 4.

FIGURE 6 shows a detailed sectional view of one of the thermocouples mounted in the ice detector probe of FIGURE 4.

FIGURE 7 shows a sectional view of an alternate type of probe element usable in an ice detector probe similar to the one shown in FIGURE 4.

FIGURE 9 shows another type of ice detector probe according to my invention in which the ice coverage is determined by the method of differential Pitot pressure.

FIGURE 10 shows schematically the method for determining the ice distribution of the probe element of the ice detector shown in FIGURE 9.

FIGURE 11 shows a differential pressure meter for displaying quantitatively the ice danger as detected by the apparatus shown in FIGURE 9.

FIGURE 12 shows the relationship between differential pressure and ice danger as detected by the probe element of FIGURE 9 and the differential pressure meter of FIGURE 11.

FIGURE 13 shows a partially insulated version of an ice detector probe element suitable for apparatus as shown in FIGURE 9.

FIGURE 14 shows another type of ice detector probe according to the present invention.

FIGURE 15 shows schematically the heat flow and temperature gradient measuring arrangement for the apparatus of FIGURE 14 when the probe is free of ice deposits.

FIGURE 16 shows schematically the same apparatus of FIGURE 15 when the probe element is coated with ice.

FIGURE 17 shows how the temperature gradient measurement in the apparatus of FIGURE 14 can be used to control the carburetor heating system of an engine.

Figure 1A:
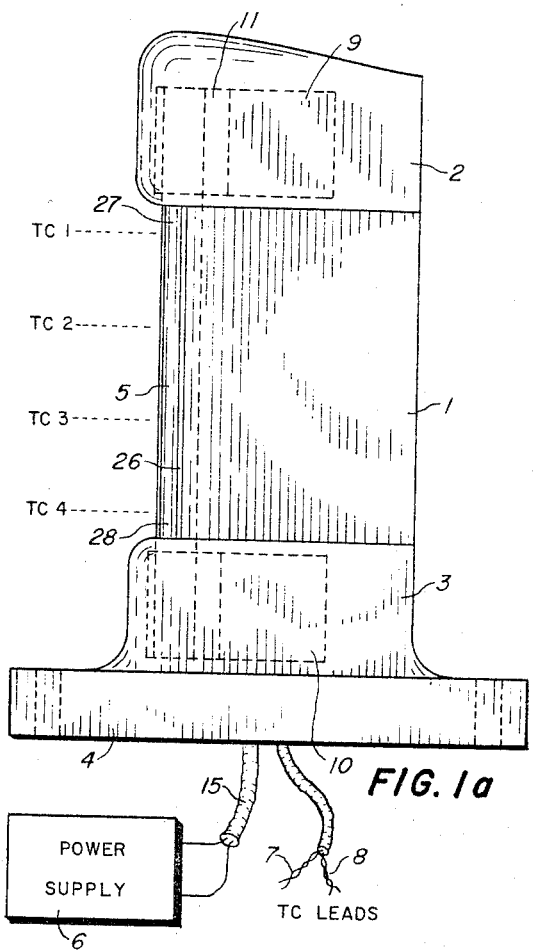
FIGURE 1 is a side view along with composite sectional views of an ice detector probe according to the present invention.
Figure 1B:
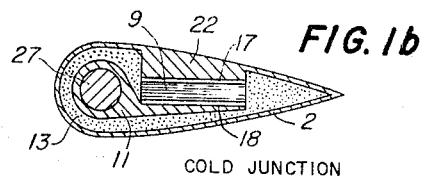
Figure 1C:
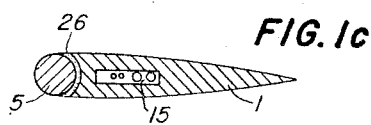
Figure 1D:
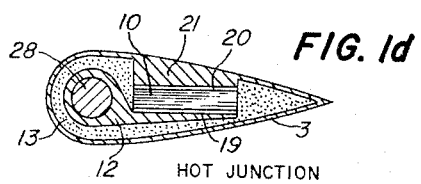
Figure 1E:
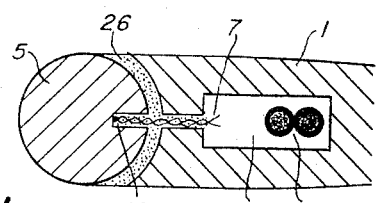

Returning more specifically to FIGURE 1, an ice detector probe is shown in which a heat conductive rod 5 is mounted in the leading edge of the probe support 1. A thermal insulating layer 26 separates the heat conductive rod 5 from the probe support 1. The cold junction 18 of the thermoelectric heat pump 9 is thermally coupled to the upper end 27 of the heat conductive rod 5 by means of the heat shunt 11. The hot junction 17 of the thermoelectric heat pump 9 is thermally coupled to the metal housing 2 by means of the heat shunt 22. Because of the relatively large heat exchange surface 2 coupled to the hot junction 17, the hot junction 17 is maintained at substantially ambient temperature. The cold junction 18 and the upper end 27 of the heat conductive rod 5 are maintained at about 40° C. below ambient when the rated current is passed through the thermoelectric heat pump 9 from the power supply 6. Insulation material 13 separates the outer metal housing 2 which is at ambient temperature from the cold junction 18, the heat shunt 11, and the conductive rod end 27 which are all maintained at 40° C. below ambient temperature by the heat pumping action of the thermoelectric heat pump 9.

The hot junction 19 of the thermoelectric heat pump 10 is thermally coupled to the lower end 28 of the heat conductive rod 5 by means of the heat shunt 12. The cold junction 20 of the thermoelectric heat pump 10 is thermally coupled to the metal housing 3 by means of the heat shunt 21. Because of the relatively large heat exchange surface 3 coupled to the cold junction 20, the cold junction is maintained at substantially ambient temperature.

The hot junction 19 and the lower end 28 of the heat conductive rod 5 are maintained at about 40° C. above ambient when the rated current is passed through the thermoelectric heat pump 10 from the power supply 6. The two thermoelectric heat pumps 9 and 10 are connected in series and are connected to the power supply 6 through the leads 15. Insulation material 13 separates the outer metal housing 3 which is at ambient temperature from the hot junction 19, the heat shunt 12, and the conductive rod end 28 which are all maintained at 40° C. above ambient temperature by the heat pumping action of the thermoelectric heat pump 10.

In all of the sectional views shown in FIGURE 1 and in the following figures, the thermoelectric heat pump is not shown as sectioned. Unnecessary complexity is thereby avoided. The details of construction and the theory behind the thermoelectric heat pump are well known and a wide variety of these devices are available commercially. These thermoelectric coolers, as they are sometimes called, utilize the physical phenomena known as the Peltier Effect to pump heat between two junctions. The resulting cold junction can be used to absorb heat from some external heat source and the hot junction can be used to supply heat to some external heat sink. The efficiency of this heat pumping action is almost independent of the absolute temperature throughout the temperature range encountered in the environment so the ice detector probe described herein can function effectively at any ambient temperature including those encountered at very high altitudes.

It may be seen therefore from FIGURE 1 that means have been provided for cooling one end 27 of a heat conductive rod 5 to a temperature about 40° C. below ambient and for heating the opposite end 28 of the same heat conductive rod 5 to a temperature of about 40° C. above ambient. It is obvious that heat will flow through the rod from the hot end toward the cold end. It is also obvious that the temperature of the rod will be ambient very near the center of the rod. Heat will be lost to the atmosphere all along the half of the rod 5 that is above ambient temperature. Heat will be absorbed from the atmosphere all along the half of the rod 5 that is below ambient temperature. Because the heat exchange surface area is uniform along the length of the rod it is obvious that the temperature gradients will be symmetrical on both sides of the center of the rod—increasing above ambient below the center and decreasing below ambient above the center and reaching 40° C. below ambient at the upper extreme end 27 of the rod 5 and 40° above ambient at the lower extreme end 28 of the rod 5. The temperature gradients on both sides of the center of the conductive rod 5 will remain symmetrical as long as the effective heat exchange surface area remains the same on both sides of the center.

Figure 2:
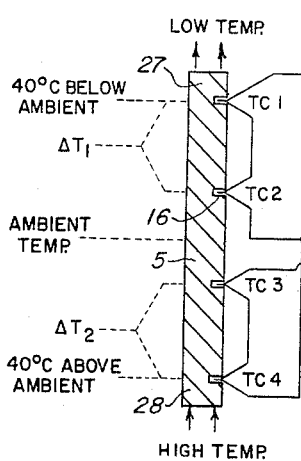
FIGURE 2 is a schematic diagram of the probe element showing the distribution of temperature along the probe and one method for monitoring the symmetry of the thermal gradients.

Four thermocouples are mounted within the conductive rod 5. One of these thermocouples is shown in detail in FIGURE 1E. The thermocouple 16 is mounted within a hole drilled in the rod 5. Insulation 26 prevents conduction of heat from the rod 5 to the probe support member 1. A hollow space 14 extends through the center of the probe support member 1 and serves as a conduit through which the various electrical leads may be passed. The positions of the various thermocouples along the rod are shown in FIGURES 1A and 2. Thermocouples TC1 and TC2 are used to measure the temperature gradient in the colder-than-ambient half of the rod 5. Thermocouples TC3 and TC4 are used to measure the temperature gradient in the hotter-than-ambient half of the rod 5. The thermocouples are differentially connected so that the outputs are equal when the temperature gradients are symmetrical. Therefore when the temperature gradients are symmetrical, the output of the differential amplifier will be zero regardless of the absolute temperatures of the various portions of the rod.

FIGURE 2 shows schematically the heat conductive rod 5 of the ice detector probe of FIGURE 1. The upper end 27 of the heat conductive rod 5 is maintained at 40° C. below ambient by the thermoelectric heat pump 9. The lower end 28 of the heat conductive rod 5 is maintained at 40° C. above ambient by the thermoelectric heat pump 10. The arrangement of the four thermocouples are also shown. Thermocouples TC1 and TC2 are used to measure $\Delta T_1$ which is the gradient in the cold half of the heat conductive rod 5. Thermocouples TC3 and TC4 are used to measure $\Delta T_2$ which is the gradient in the hot half of the heat conductive rod 5. The center of the rod 5 is at ambient temperature. The gradients on both sides of the center will be symmetrical and the differential amplifiers 23 output as indicated by the meter 24 will be zero as long as the effective heat exchange surface area remains the same on both halves of the rod. These conditions will remain the same regardless of the environmental temperatures encountered by the ice detector probe as long as the probe remains free of ice.

When the ice detector probe of FIGURES 1 and 2 is exposed to an environment of low temperatures and increasing humidity, ice will begin to form on the conductive rod 5. An ice cover will form on the conductive rod 5 starting at the cold end 27 and as the ice conditions are increased the ice cover will progress further toward the center. If the icing conditions are severe enough to cause ice deposition on the aircraft itself (which is at ambient temperature) the ice will have covered about half the length of the heat conductive rod 5. The heat conductivity of ice is much lower than that of the material of the rod 5. For example the heat conductive rod 5 may be of silver with a coefficient of thermal conductivity of 0.974 or copper with a coefficient of 0.918. The coefficient of thermal conductivity of ice is 0.005 which may be considered as a thermal insulator when compared to rod materials of silver or copper. When ice forms on the heat conductive rod 5, there will be a smaller thermal gradient along that portion of the rod covered by ice. In other words the thermal gradient in the cooler-than-ambient half of the rod will be decreased. At the same time, the thermal gradient in the hotter-than-ambient half of the rod will be correspondingly increased since the overall temperature difference between the two ends of the rod will remain about the same. The deviation from a condition of balanced thermal gradients caused by the ice formation is measured by the differential amplifier 23 and indicated on the meter 24. The indication of the meter 24 is proportional to the percentage of ice coverage along the length of the heat conductive rod 5 of the ice detector probe.

Figure 3:
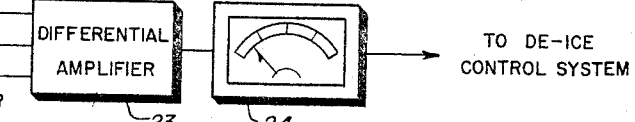
FIGURE 3 is a tabular listing of the thermal gradients and associated output signals resulting from various ice conditions.

FIGURE 3 shows in tabular form the relationship between percentage ice coverage on the heat conductive rod of the ice detector probe of FIGURES 1 and 2 and the resulting thermal gradients, differences in thermal gradients, differential amplifier outputs, and ice indicator readings.

FIGURE 4 shows an ice detector probe somewhat similar to the one described in FIGURES 1 and 2 except that a single thermoelectric heat pump is used. A heat conductive probe 29 is bent double so that one end 33 is thermally coupled to the cold junction of the thermoelectric heat pump 31 and the opposite end 32 is thermally coupled to the hot junction of the thermoelectric heat pump 31. The cold end 33 of the heat conductive probe 29 is approximately 40° C. lower in temperature than the hot end 32. The average temperature of the entire probe will be about ambient.

In the absence of icing conditions, the temperature distribution along the heat conductive probe will be substantially as shown in FIGURE 5. One end of the probe will be at 20° C. below ambient and the opposite end will be at 20° C. above ambient. The center of the probe will be at ambient temperature. The thermal gradients on both sides of center will remain equal as long as the probe remains free of ice. Ice formation on the probe results in an imbalance of the thermal gradients on each side of the center of the probe 29. When the imbalance of the thermal gradients in the probe 29 exceeds some present level as detected by the differentially connected thermocouples, the relay 43 is closed thereby actuating the ice indicator 44. The relay 43 may be set to close at any desired percentage of ice coverage on the probe 29. It may be readily seen that the ice indicator can be set to give warning of the approach of dangerous icing conditions even before ice can possibly form on the protected equipment which is at ambient temperature. The ice indicator may be used to automatically activate a de-icing system.

FIGURE 6 shows a detailed sectional view of one of the thermocouples 39 mounted within the ice detector probe 29.

FIGURE 7 shows a sectional view of an alternate type of probe element suitable for use in the ice detector shown in FIGURES 4 and 5. A layer 46 of material having a relatively low thermal conductivity covers all but the leading edge of the probe element 45. The insulating layer 46 may be of glass, porcelain, Teflon, or any material with a relatively low thermal conductivity. The insulating layer 46 prevents the excessive exchange of heat with the atmosphere thereby allowing the maintenance of a large temperature gradient along the heat conductive probe element without using excessive heat pumping power.

FIGURE 9 shows an ice detector probe element 50 along which a temperature gradient is maintained by the thermoelectric heat pump 53 exactly as described for FIGURE 4. However, a different means is provided for detecting the extent of ice coverage along the length of the probe element 50. The tube 50 is hollow and an obstruction 52 separates the inside into two chambers. A series of small holes connect each of the two chambers of the tube 50 with the outside. When the probe is exposed to the flow of air as shown in FIGURE 9B, the impact of the air directly into the holes causes the pressure to increase within the two inner chambers of the tube 50. The size and number of holes in each half of the tube 50 can be made equal so that the impact pressure within the two inner compartments will always be equal regardless of the speed of the air flow. However, when the ice detector probe is exposed to environmental conditions which are conductive to ice formation, ice will form on the probe 50 starting at the cold end 57 and progressing toward the center as the ice conditions become worse. As the ice coverage on the probe 50 progresses toward the center an increasing number of the holes are covered with ice thereby decreasing the impact pressure within the colder-than-ambient half of the ice detector probe. The differentially measured pressure within the two inner chambers of the probe element 50 is used as a measure of the ice coverage.

FIGURE 9C shows a bottom view of the two ends 56 and 57 of the ice detector probe element 50 and the means whereby they are thermally coupled to the hot and cold junctions of the thermoelectric heat pump 53.

FIGURE 10 shows a diagram of the differential pressure method of determining the ice coverage on a thermal gradient ice detector probe. An elongated heat conductive probe elements in shown having its upper end 64 maintained at 20° C. below ambient temperature. The lower end 65 is maintained at 20° C. above ambient temperature. This can be accomplished in the manner shown in FIGURE 9. A temperature gradient will exist along the rod ranging from 20° C. below ambient at one end to 20° C. above ambient at the other end. When exposed to air flow as shown, the pressure within the colder-than-ambient portion 62 will be equal to the pressure within the warmer-than-ambient portion 63 as long as all of the holes, such as the holes 67 and 68, are free of ice cover. The pressures $P_1$ and $P_2$ are connected to the differential pressure switch 71 by means of the tubes 69 and 70. When icing conditions are encountered ice will begin to form first on the cold end 64 of the ice detector probe element and as the ice danger increases a greater number of the impact holes in the upper section will be covered with ice. This will result in a decrease in the pressure in the chamber 62 as compared to the pressure in the chamber 63. The differential pressure will be proportional to the percentage of ice coverage along the length of the probe element. When the differential pressure exceeds some preset value, the differential pressure switch 71 will be closed thereby actuating the ice indicator 72. The pressure bleed holes are not shown in the pressure lines 69 and 70. The ice indicator 72 may be visual or audible or it may be used to automatically activate a deicing system or carburetor heater.

FIGURE 11 shows a differential pressure guage 73 which can be connected in place of the differential pressure switch thereby giving a quantitative indication of the ice danger. The relationship between differential pressure and the environmental ice danger being encountered is shown in FIGURE 12.

FIGURE 13 shows an alternate type of probe construction suitable for use in ice detector systems shown in FIGURES 9 and 10. An insulating material 76 covers most of the surface area of the probe element 75 except for the leading edge 78 adjacent the impact holes such as 77. The purpose of this insulation cover on the probe is the same as described for FIGURE 7.

FIGURE 14 shows an ice detector probe in which a heat conductive rod 82 forms the leading edge of the support member 81 from which it is thermally separated by the insulation 80. A thermoelectric heat pump 88 is mounted within the base housing 84. The hot junction 87 of the thermoelectric heat pump 88 is thermally coupled to the exterior heat exchange surfaces 84 and 81 by means of the thermal shunt 89. The hot junction 87 of the thermoelectric heat pump 88 is thereby maintained at substantially ambient temperature. The cold junction 86 of the heat pump 88 is maintained at a temperature considerably below ambient temperature (for example 40° C. below ambient) when electrical current is passed through the heat pump 88 through the leads 93. The lower end 85 of the heat conductive rod 82 is thermally coupled to the cold junction 86 of the heat pump 88. The cold junction 86 and the lower end 85 of the heat conductive rod 82 are thermally insulated from the housing 84 and the probe support member 81. The leading edge of the heat conductive rod 82 is exposed to the atmosphere. Since the lower end 85 of the rod 82 is at a temperature considerably below ambient, the rod 82 will absorb heat from the atmosphere along its entire length. The upper end of the rod 82 is thermally coupled to the relatively large heat exchange surface 83 which is exposed to the atmosphere. The upper end of the rod 82 is thus maintained at ambient temperature. Since the upper end of the heat conductive rod 82 is maintained at ambient temperature and the lower end 85 is maintained at, for example, 40° C. below ambient, there will be a continuous thermal gradient along the length of the rod 82.

When the probe assembly of FIGURE 14 is exposed to conditions of low temperature and increasing humidity, ice will form on the colder-than-ambient rod 82 beginning at the coldest portion adajcent the lower end 85 and progressing upward as the icing conditions become more severe. Thermistors 91 and 92 are mounted within the rod 82. When there is no ice cover on the probe 82 there will be a continuous thermal gradient along the rod 82 so that the thermistors 91 and 92 will be at widely different temperatures (for example 20° C.). When an ice cover forms on the rod 82 there is very little absorption of heat from the atmosphere for that portion of the rod covered by ice. The temperature difference between the two thermistors 91 and 92 will be therefore reduced.

The temperature difference will be reduced considerably if the entire lower half of the rod 82 is covered by a layer of ice. The decrease in thermal gradient in the colder end of the rod is an indication that ice has formed on the rod and that atmospheric conditions exist which are approaching the danger point.

FIGURE 15 shows a diagram of the flow of heat in the ice detector system shown in FIGURE 14. If the heat pump 99 cools the lower end of the rod 95 to a low temperature relative to ambient, the flow of heat down the rod 95 will result in a thermal gradient so that the thermistors 97 and 98 are exposed to widely different temperatures. This is the normal ice free condition and the variable resistor 102 can be set so that the meter 101 indicates a no ice condition.

FIGURE 16 shows the same apparatus and diagram except that a cover of ice 104 has formed on the heat conductive rod 95. The insulating effect of the ice cover has greatly reduced the absorption of heat from the atmosphere for the portion of the rod 95 covered by ice. There is therefore a smaller thermal gradient so that the thermistors 97 and 98 are closer to the same temperature. The meter 101 across the resistance bridge now indicates the approach or existence of an ice condition in the atmosphere.

FIGURE 17 shows how the apparatus similar to that described in FIGURES 14, 15, and 16 can be used to automatically activate a carburetor heating or other deicing system when icing conditions are detected.

It will be seen therefore that I have provided an ice detection system which has many advantages over the prior art. In addition to the functional advantages outlined in the above specifications, it should also be apparent that the presently described ice detection system can be manufactured at a much lower cost than any system available heretofore. The capability of this ice indicating system to detect the approach of icing conditions before they actually become critical and the low cost potential are particularly significant factors when combined because they mean that for the first time it will be economically feasible to install an automatic carburetor heat control on small private aircraft.

It will be apparent that modifications will be readily suggested to others skilled in the art as the result of these specifications and drawings, therefore it should be understood that the invention is not limited by the specific constructions herein described, which are intended to be only illustrative and exemplary, and should be restricted only insofar as set forth in the following claims.

What is claimed is:

1. Apparatus for detecting the approach of icing conditions in the atmosphere comprising: an elongated probe element of high thermal conductivity; means for supporting the said probe element in a probe assembly exposed to the atmosphere; a thermoelectric heat pumping device utilizing the Peltier Effect; means for supplying electrical current to the said heat pumping device, separate hot and cold junctions thereby resulting; means for thermally coupling the said hot junction to a substantially large heat exchanging surface exposed to the atmosphere, the said hot junction being thereby maintained at ambient temperature; means for thermally coupling the said cold junction to the first end of the said elongated probe element, the first end being thereby maintained at a temperature substantially below ambient temperature, and thermal gradients being thereby maintained along the length of the probe element ranging from substantially below ambient temperature at the first end of the said probe element to near ambient temperature at the second end of the said probe element, the said second end being maintained at near ambient temperature by the gradual absorption of heat from the atmosphere along the length of the said probe element; means for detecting the formation of ice on a portion of the said probe element which is maintained at below ambient temperature; and means for indicating the approach of icing conditions as a result of the said ice formation.

2. Apparatus for detecting the approach of icing conditions in the atmosphere comprising: an elongated probe element of high thermal conductivity; means for supporting the said probe element in a probe assembly exposed to the atmosphere; a thermoelectric heat pumping device utilizing the Peltier Effect; means for supplying electrical current to the said heat pumping device, separate hot and cold junctions thereby resulting; means for thermally coupling the said hot junction to a substantially large heat exchanging surface exposed to the atmosphere, the said hot junction being thereby maintained at ambient temperature; means for thermally coupling the said cold junction to the first end of the said elongated probe element, the first end being thereby maintained at a temperature substantially below ambient temperaure, and thermal gradients being thereby maintained along the length of the probe element ranging from substantially below ambient temperature at the first end of the said probe element to near ambient temperature at the second end of the said probe element, the said second end being maintained at near ambient temperature by the gradual absorption of heat from the atmosphere along the length of the said probe element; means for measuring the thermal gradient within the said probe element adjacent the said first end; means for detecting a substantial decrease in the said thermal gradient due to the formation of an insulating ice cover on the said probe element adjacent the said first end; and means for indicating the approach of critical icing conditions as a result of the said detected decrease in thermal gradient.

3. Apparatus for detecting the approach of critical icing conditions in the atmosphere and for automatically controlling the carburetor heater of an internal combustion engine when the icing conditions exceed some predetermined danger level comprising in combination: an elongated probe element of high thermal conductivity; means for supporting the said probe element in a probe assembly exposed to the atmosphere; a thermoelectric heat pumping device utilizing the Peltier Effect; means for supplying electrical current to the said heat pumping device, separate hot and cold junctions thereby resulting; means for thermally coupling the said hot junction to a substantially large heat exchanging surface exposed to the atmosphere, the said hot junction being thereby maintained at ambient temperature; means for thermally coupling the said cold junction to the first end of the said elongated probe element, the first end being thereby maintained at a temperature substantially below ambient temperature, and thermal gradients being thereby maintained along the length of the probe element ranging from substantially below ambient temperature at the first end of said probe element to near ambient temperature at the second end of the said probe element, the said second end being maintained at near ambient temperature by the gradual absorption of heat from the atmosphere along the length of the said probe element; means for measuring the thermal gradient within a segment of the said probe element adjacent the said first end; means for detecting a substantial decrease in the said thermal gradient due to the formation of ice on the said probe element adjacent the said first end; and switching means for activating the aforementioned carburetor heater in response to the said detected decrease in thermal gradient.

4. Apparatus for quantitively indicating the approach or existence of icing conditions encountered by an aircraft comprising: an elongated probe element of high thermal conductivity; means for supporting the said probe element in a probe assembly exposed to the atmosphere; a first thermoelectric heat pumping device, the said device operating on the well known Peltier Effect; means for supplying electrical current to the said first thermoelectric heat pump, separate hot and cold junctions resulting therefrom; means for thermally coupling the hot junction of the said first thermoelectric heat pump to a substantially large heat exchanging surface exposed to the atmosphere, a hot junction temperature substantially at ambient thereby resulting; means for thermally coupling the cold junction of the said first thermoelectric heat pump to the first end of the said elongated probe element, the said first end of the said probe element being thereby maintained at a temperature substantially lower than ambient temperature; a second thermoelectric heat pumping device; means for supplying electrical current to the said second thermoelectric heat pump, separate hot and cold junctions resulting therefrom; means for thermally coupling the cold junction of the said second thermoelectric heat pump to a substantially large heat exchanging surface exposed to the atmosphere, a cold junction temperature substantially at ambient thereby resulting; means for thermally coupling the hot junction of the said second thermoelectric heat pump to the second end of the said elongated probe element, the said second end of the said probe element being thereby maintained at a temperature substantially higher than ambient temperature, and a continuous thermal gradient being thereby maintained between the said first and second ends of the said elongated probe element, the said thermal gradient ranging from substantially below ambient at the said first end to substantially above ambient at the said second end and the said gradient passing through the ambient temperature at some intermediate position between the two ends of the said probe element; means for measuring the extent of ice coverage along the length of the said probe element, the said ice being deposited from the atmosphere onto the said probe element at increasingly higher temperatures along the thermal gradient as the ice conditions become increasingly dangerous to the aforementioned aircraft; and means for indicating quantitatively the icing conditions encountered by the aircraft as a function of the said measured ice coverage.

5. Apparatus as described in claim 4 further characterized by: means for activating a deicing system in response to a predetermined threshold icing condition.

6. Apparatus for quantitatively indicating the approach or existence of icing conditions encountered by an aircraft comprising: an elongated probe element of high thermal conductivity; means for supporting the said probe element in a probe assembly exposed to the atmosphere; a first thermoelectric heat pumping device, the said device operating on the well known Peltier Effect; means for supplying electrical current to the said first thermoelectric heat pump, separate hot and cold junctions resulting therefrom; means for thermally coupling the hot junction of the said first thermoelectric heat pump to a substantially large heat exchanging surface exposed to the atmosphere, a hot junction temperature substantially at ambient thereby resulting; means for thermally coupling the cold junction of the said first thermoelectric heat pump to the first end of the said elongated probe element, the said first end of the said probe element being thereby maintained at a temperature substantially lower than ambient temperature; a second thermoelectric heat pumping device; means for supplying electrical current to the said second thermoelectric heat pump, separate hot and cold junctions resulting therefrom; means for thermally coupling the cold junction of the said second thermoelectric heat pump to a substantially large heat exchanging surface exposed to the atmosphere, a cold junction temperature substantially at ambient thereby resulting; means for thermally coupling the hot junction of the said second thermoelectric heat pump to the second end of the said elongated probe element, the said second end of the said probe element being thereby maintained at a temperature substantially higher than ambient temperature, and a continuous thermal gradient being thereby maintained between the said first and second ends of the said elongated probe element, the said thermal gradient ranging from substantially below ambient at the first end to substantially above ambient at the said second end and the said gradient passing through the ambient temperature at some intermediate position between the two ends of the said probe element; means for measuring a first thermal gradient in the said probe element adjacent the said first end; means for measuring a second thermal gradient in the said probe element adjacent the said second end; means for differentially measuring the said first and second thermal gradients; and means for indicating the environmental icing conditions encountered by the said probe assembly as a function of the measured difference between the said first and second thermal gradients.

7. Apparatus as described in claim 6 further characterized by: means for activating a deicing system in response to a predetermined indicated icing condition.

8. Apparatus for indicating environmental icing conditions comprising: an elongated probe element of high thermal conductivity, the said elongated element being bent double so that the two ends are in close proximity but thermally isolated each from the other; means for supporting the said probe element in a probe assembly exposed to the atmosphere; a thermoelectric heat pumping device, operative according to the well kown Peltier Effect, positioned adjacent the said two ends of the said elongated probe element; means for supplying electrical current to the said thermoelectric heat pump, separate hot and cold junctions resulting therefrom; means for thermally coupling the first end of the said elongated probe element to the cold junction of the said thermoelectric heat pump, the said first end of the said probe element being thereby maintained at a temperature substantially below ambient temperature; means for thermally coupling the second end of the said elongated probe element to the hot junction of the said thermoelectric heat pump, the said second end of the said probe element being thereby maintained at a temperature substantially above ambient temperature, a continuous thermal gradient being thereby maintained along the full length of the said probe element between the said first and second ends, the said thermal gradient ranging from substantially below ambient at the said first end to substantially above ambient at the said second end, and the said gradient passing through the ambient temperature at some intermediate position along the said probe element between the two ends; means for measuring the extent of ice coverage along the length of the said probe element, the said ice being deposited from the atmosphere onto the said probe element at increasingly higher temperatures along the thermal gradient as the ice conditions become increasingly severe; and means for indicating the icing condition of the environment as a function of the said measured ice coverage.

9. Apparatus for indicating environmental icing conditions comprising: an elongated probe element of high thermal conductivity, the said elongated element being bent double so that the two ends are in close proximity but thermally isolated each from the other; means for supporting the said probe element in a probe assembly exposed to the atmosphere; a thermoelectric heat pumping device, operative according to the well known Peltier Effect, positioned adjacent the said two ends of the said elongated probe element; means for supplying electrical current to the said thermoelectric heat pump, separate hot and cold junctions resulting therefrom; means for thermally coupling the first end of the said elongated probe element to the cold junction of the said thermoelectric heat pump, the said first end of the said probe element being thereby maintained at a temperature substantially below ambient temperature; means for thermally coupling the second end of the said elongated probe element to the hot junction of the said thermoelectric heat pump, the said second end of the said probe element being thereby maintained at a temperature substantially above ambient temperature, a continuous thermal gradient being thereby maintained along the full length of the said probe element between the said first and second ends, the said thermal gradient ranging from substantially below ambient at the said first end to substantially above ambient at the said second end, and the said gradient passing through the ambient temperature at some intermediate position along the said probe element between the two ends; means for measuring a first thermal gradient in the said probe element adjacent the said first end; means for measuring a second thermal gradient in the said probe element adjacent the said second end; means for differentially measuring the said first and second thermal gradients; and means for indicating the environmental icing conditions encountered by the said probe element as a function of the measured difference between the said first and second thermal gradients.

10. Apparatus as described in claim 8 further characterized by: means for activating a deicing system in response to a predetermined indicated icing condition.

11. Apparatus as described in claim 8 further characterized by: means for activating a carburetor heating system in response to a predetermined indicated icing condition.

12. Apparatus as described in claim 9 further characterized by: means for activating a deicing system in response to some predetermined measured icing condition.

13. Apparatus as described in claim 9 further characterized by: means for activating a carburetor heating system in response to some predetermined indicated icing condition.

References Cited by the Examiner

UNITED STATES PATENTS

| 2,208,689 | 7/1940 | Sulzman | 244—134 X |
| 2,336,238 | 12/1943 | Fordyce et al. | 73—17 |
| 2,699,537 | 1/1955 | Sederstrom | 340—234 |
| 2,730,892 | 1/1956 | Bruce et al. | 73—17 |
| 2,755,456 | 7/1956 | Bursack | 340—234 |
| 2,766,619 | 10/1956 | Tribus et al. | 73—170 |
| 2,774,238 | 12/1956 | Gerwig | 73—17 |

RICHARD C. QUEISSER, *Primary Examiner.*

JACK C. GOLDSTEIN, *Assistant Examiner.*